US009482476B2

(12) United States Patent
Al-Otaibi

(10) Patent No.: US 9,482,476 B2
(45) Date of Patent: Nov. 1, 2016

(54) PLUG KIT FOR PRESSURED COMPONENTS

(75) Inventor: Abdullah M. Al-Otaibi, Khobar (SA)

(73) Assignee: SAUDI ARABIAN OIL COMPANY (SA)

( * ) Notice: Subject to any disclaimer, the term of this patent is extended or adjusted under 35 U.S.C. 154(b) by 997 days.

(21) Appl. No.: 12/751,252

(22) Filed: Mar. 31, 2010

(65) Prior Publication Data
US 2011/0240278 A1 Oct. 6, 2011

(51) Int. Cl.
| | | |
|---|---|---|
| F28F 11/02 | (2006.01) |
| F16L 55/13 | (2006.01) |
| F28F 11/04 | (2006.01) |
| F28F 9/013 | (2006.01) |
| F16L 55/10 | (2006.01) |

(52) U.S. Cl.
CPC ............... *F28F 11/02* (2013.01); *F16L 55/13* (2013.01); *F28F 11/04* (2013.01); *F16L 55/10* (2013.01); *F28F 9/013* (2013.01); *F28F 2220/00* (2013.01); *Y10T 29/49826* (2015.01)

(58) Field of Classification Search
CPC ....... F28F 9/013; F28F 2220/00; F16L 55/10
USPC ................................. 165/71, 76, 168; 138/89
See application file for complete search history.

(56) References Cited

U.S. PATENT DOCUMENTS

| | | | | |
|---|---|---|---|---|
| 1,471,157 | A * | 10/1923 | Gruber ........................ 224/42.15 |
| 1,808,411 | A | 6/1931 | Hlnkston |
| 2,070,780 | A | 2/1937 | Boyer |
| 2,512,169 | A * | 6/1950 | Nachtigal ........................ 138/89 |
| 3,051,200 | A | 8/1962 | Bevington |
| 3,119,177 | A * | 1/1964 | Knecht ..................... 29/890.031 |
| 3,680,422 | A | 8/1972 | Salvador |
| 4,114,654 | A * | 9/1978 | Richardson ..................... 138/89 |
| 4,248,271 | A | 2/1981 | Burgess |
| 4,290,543 | A * | 9/1981 | Larson ........................... 228/2.5 |
| 4,436,117 | A * | 3/1984 | Martin ............................. 138/89 |

(Continued)

FOREIGN PATENT DOCUMENTS

| | | |
|---|---|---|
| AT | 344211 B | 7/1978 |
| DE | 185045 C | 7/1906 |

(Continued)

OTHER PUBLICATIONS

International Search Report issued in PCT Application Serial No. PCT/US2011/030647 dated May 31, 2011. (7 pages).

(Continued)

*Primary Examiner* — M. Alexandra Elve
*Assistant Examiner* — Joel Attey
(74) *Attorney, Agent, or Firm* — Bracewell LLP; Constance Gall Rhebergen

(57) ABSTRACT

An apparatus for plugging a bore of a tube sheet, the apparatus includes cantilevered members that project radially outward from a body on the inner surface of the tube sheet. Slots can be drilled into a tube the projects into the bore and the cantilevered members set into the slots. The cantilevered members can slide radially outward from within the body, or can be pivotingly attached on an end of the body. One end of a bolt threadingly attaches to the body, and attaches on its other end to a nut circumscribing the tube sheet bore on its outer surface. A deformable collar circumscribes the bolt between the body and nut and provides a seal within the tube sheet bore. The apparatus can also be used to plug bores that do not include tubes.

11 Claims, 6 Drawing Sheets

(56) References Cited

U.S. PATENT DOCUMENTS

| | | | | |
|---|---|---|---|---|
| 4,598,738 | A * | 7/1986 | Weber et al. | 138/89 |
| 4,637,436 | A * | 1/1987 | Stewart et al. | 138/89 |
| 4,723,578 | A | 2/1988 | Mordarski et al. | |
| 4,751,944 | A * | 6/1988 | Sinha et al. | 138/89 |
| 4,762,152 | A * | 8/1988 | Clausen | 138/89 |
| 4,765,374 | A * | 8/1988 | Ermold et al. | 138/89 |
| 4,771,810 | A * | 9/1988 | Ermold et al. | 138/89 |
| 4,817,671 | A | 4/1989 | Mathison | |
| 4,986,313 | A * | 1/1991 | Mounet | 138/89 |
| 5,074,336 | A | 12/1991 | Black | |
| 5,249,604 | A * | 10/1993 | Keating | 138/89 |
| 5,307,841 | A | 5/1994 | Condon | |
| 5,437,310 | A | 8/1995 | Cunningham | |
| 5,494,323 | A * | 2/1996 | Huang | 292/252 |
| 5,560,394 | A | 10/1996 | Jorgensen | |
| 5,797,431 | A | 8/1998 | Adams | |
| 6,312,217 | B1 * | 11/2001 | Takahashi | 415/160 |
| 6,378,167 | B1 * | 4/2002 | Howell et al. | 16/2.1 |
| 6,533,134 | B1 * | 3/2003 | Menaged et al. | 211/87.01 |
| 7,314,065 | B1 | 1/2008 | Adelman | |
| 2004/0163818 | A1 * | 8/2004 | Fenton et al. | 166/368 |
| 2005/0121091 | A1 * | 6/2005 | Sayers et al. | 138/89 |
| 2006/0096736 | A1 | 5/2006 | Burkhalter | |
| 2006/0112908 | A1 * | 6/2006 | Lieberman | 123/41.5 |

FOREIGN PATENT DOCUMENTS

| | | |
|---|---|---|
| EP | 0 120 277 A1 | 10/1984 |
| EP | 1 519 088 A2 | 3/2005 |

OTHER PUBLICATIONS

International Search Report and Written Opinion, PCT/US2011/030714 issued May 30, 2011, 7 pages.

Office Action for co-pending U.S. Appl. No. 12/947,334 dated Sep. 12, 2014.

* cited by examiner

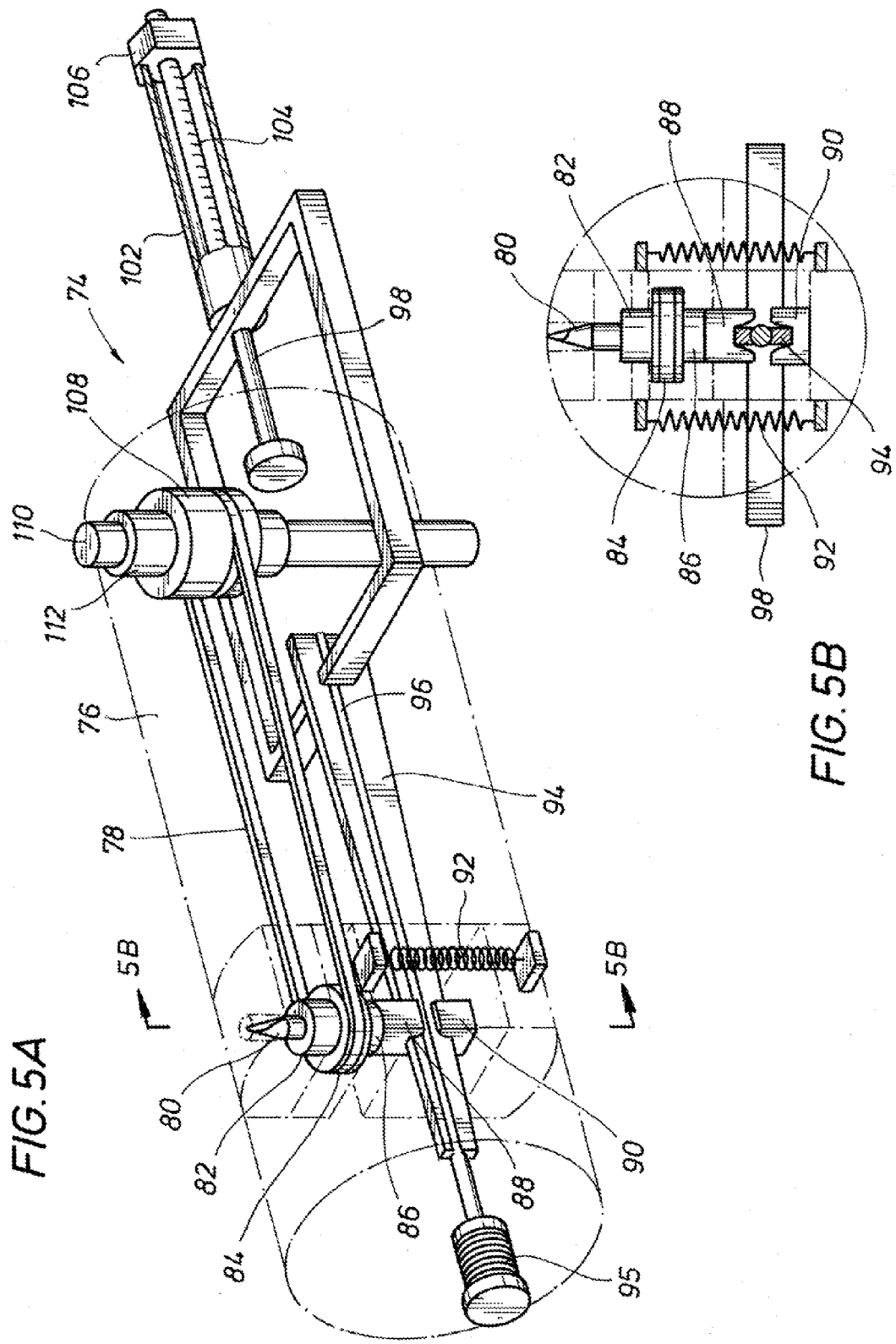

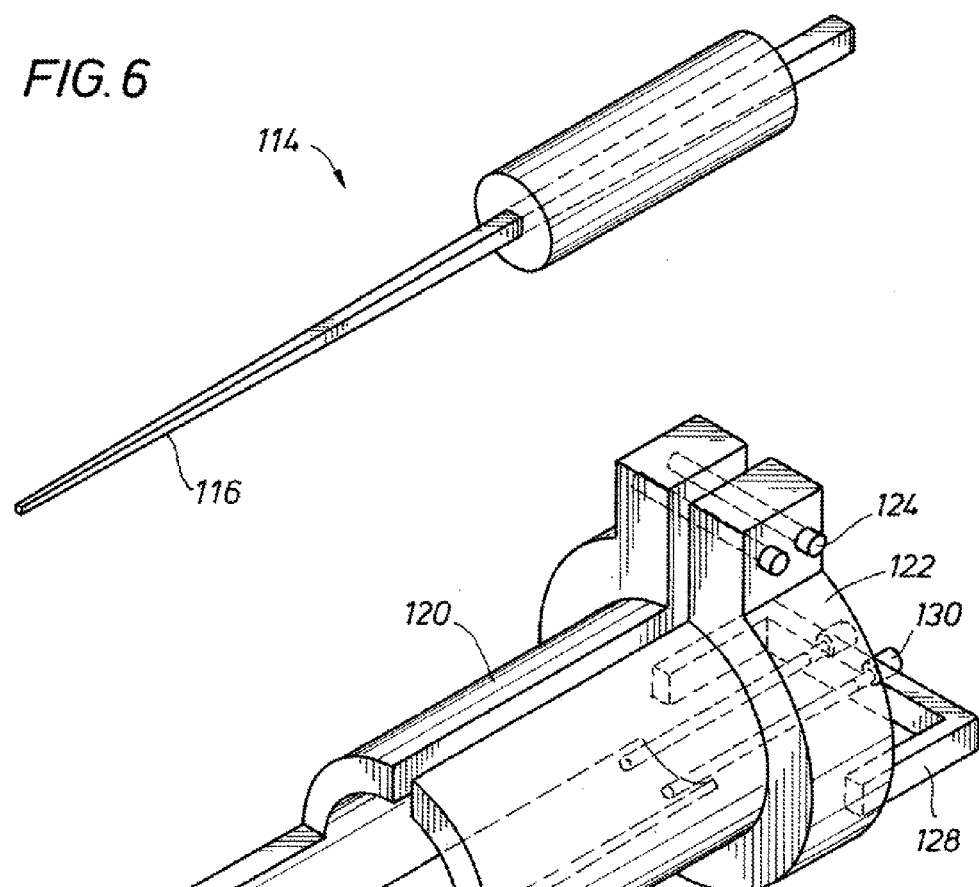
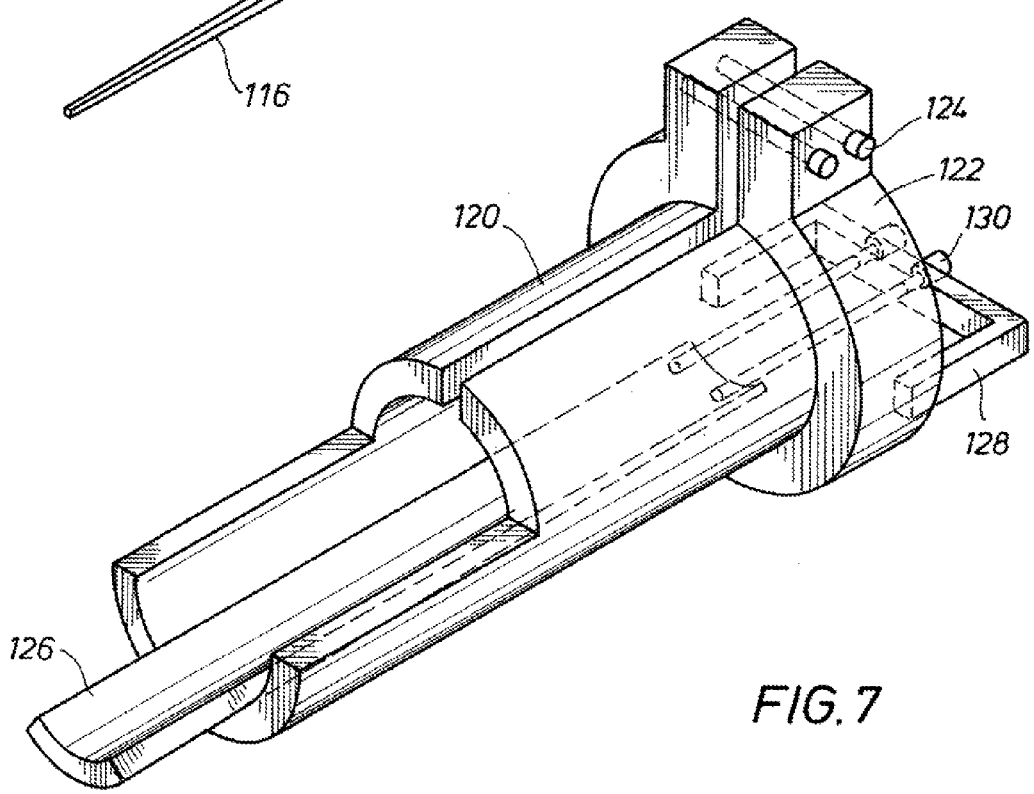

PLUG KIT FOR PRESSURED COMPONENTS

BACKGROUND OF THE INVENTION

1. Field of the Invention

The present invention relates to an apparatus for use with a fluids handing device. More specifically, the invention relates to an apparatus for plugging a fluid passage in a tube sheet.

2. Description of the Related Art

Heat exchangers for transferring heat between two different fluids typically employ multiple tubes having an inlet and an outlet both held by a tube sheet. Bores are formed through the tube sheet that register with the end of the tubes. The tubes may experience a leak along their body or where they join with the tube sheet. Corrective the leak may involve plugging the leaking tube at both ends rather than mending the leak itself.

A prior art example of a tube plugging method is shown in a perspective and partial sectional view in FIG. 1. Illustrated is a portion of a heat exchanger 10 having a substantially planar tube sheet 12, tubes 14 attached to one side of the tube sheet 12 that register with bores 16 formed through the tube sheet 12. Also shown is a tapered plug 18 that has been wedged into the end of a bore 16 having a tube 14 therein. Inserting the plug 18 with sufficient force can create a seal along the interface where the plug 18 contacts the bore 16. Pressure buildup in the tube may present a problem with using this approach. Over time the pressure in the tube 14 may dislodge the plug 18 at a velocity that could be hazardous to equipment or personnel. Also shown is an example of a bore 20 in the tube sheet 12 without an associated tube connected with the bore 20. In this example, a tube previously connected with the bore 20 has been removed, thus before the heat exchanger 10 can be placed back into operation the bore 20 must be sealed.

SUMMARY OF THE INVENTION

The present disclosure discloses a method and apparatus for plugging a tube sheet. In one example, the method employs an apparatus that creates a tensile force therein to exert oppositely facing forces on the tube sheet on opposing sides of a bore. Disclosed is a plug kit for plugging a bore in a tube sheet, in one example the plug kit includes a plug body having an axis and an outer periphery, cantilevered members coupled with the body and selectively moveable between a retracted position encompassed by the plug body outer periphery and a deployed position having a portion of the cantilevered members projecting past the plug body outer periphery, a passage in the plug body, an annular member coaxial with the passage, a threaded fastener engageable on one end with the plug body and engageable on an opposite end with the annular member, so that when the cantilevered members are in the deployed position and disposed on one side of a tube sheet, the annular member is disposed on a side of the tube sheet opposite the cantilevered members, and the threaded fastener passes through the bore of a tube sheet, engaging the threaded fastener to the plug body and the annular member sealingly plugs the tube sheet bore. The plug kit can also include a deformable annular member circumscribing the threaded fastener between the nut and plug body. An annular packing member may optionally be included that circumscribes the threaded fastener and has a portion that extends into the tube sheet bore and another larger diameter portion that sets between the tube sheet and the nut. The cantilevered members, in an embodiment, can be disposed in channels that project radially outward from the axis of the plug body. In another embodiment, the cantilevered members include ridge members coupled on a side facing opposite the nut when the cantilevered members are in the deployed position, wherein the edge of each cantilevered member closest to the axis is pivotingly attached to the side of the body opposite the nut. An elongated tab element can optionally be attached to each cantilevered member on an end proximate the axis and oriented substantially normal to the axis. The threaded fastener can contact an end of each tab element. An annular plug body holder can be included that is selectively attachable with the plug body and insertable with the plug body into a tube sheet bore; the plug body holder can include an axial bore with a diameter greater than the threaded fastener outer diameter, so that the threaded fastener bolt is insertable through the axial bore and attachable to the plug body. A fastener can connect between the plug body and the cantilevered members when the cantilevered members are in the deployed position.

Also disclosed herein is a method of plugging a bore formed in a tube sheet. In one example the method includes providing a plug kit assembly that includes an annular plug body having an axis and an outer circumference, bore sealing element, and cantilevered members coupled to the plug body. The method can also include disposing the plug body in the tube sheet bore and adjacent an end of the bore, positioning the cantilevered members in a deployed configuration having a portion outside of the outer circumference of the plug body and past the tube sheet bore diameter, disposing the bore sealing element on the side of the bore opposite the plug body, and coupling together the plug body and bore sealing element with an axial force that seals the bore. In an embodiment, a tube can be included within the tube sheet bore and slots drilled in the tube, the plug body is positioned so that each cantilevered member is aligned with a corresponding slot and the cantilevered members can be urged radially outward from the plug body and into the corresponding slot. A drilling device can be used to drill the slots. In an example the drilling device can include a body, a rotating chuck, a machining element in the chuck, a rotating drive system coupled to the chuck, an elongated push rod having a varying height and slidable under the chuck. This is so that when an increased height portion of the wedge is positioned under the chuck the machining element projects out of the housing. The drilling device is inserted into the tube and the chuck and machining element rotated by activating the rotating drive system. The push rod is motivated so that an increased height portion is under the chuck to urge the machining element into cutting contact with the tube. The cantilevered members of the disclosed method can be disposed in channels formed in the plug body, where the channels extend radially outward from an annulus in the plug body to the plug body outer circumference and wherein the cantilevered members are selectively moveable between a stowed position where a portion of the cantilevered members are within the annulus and the members are circumscribed by the plug body outer circumference and a deployed position where a portion of the cantilevered members project past the plug body outer circumference. A spreader tool can be used to move the cantilevered members from the stowed position into the deployed position by inserting the spreader tool into the annulus to outwardly urge the cantilevered members. The bore sealing element can be an annular nut, so that sealing the bore includes opposite ends of a threaded fastener to the annular nut and the plug body. The bore sealing element can further include a washer and compressible collar both coaxially circumscribing the threaded fastener, wherein a portion of the washer is disposed between the nut and the bore and another portion of the washer is within the tube sheet bore, and the compressible collar is between the washer and the plug body. The plug body can have an annulus along its axis; in one example the edge of each cantilevered member closest to the plug body axis is pivotingly attached to the side of the plug body opposite the bore sealing element, and wherein ridge members are provided on a side of the cantilevered members opposite the side that contacts plug body when the cantilevered members are pivoted away from the plug body axis, so that when a threaded element is inserted through the plug body annulus, the threaded element contacts the ridge members to pivot the cantilevered members in a deployed position and in a plane that is substantially normal to the plug body axis.

The present disclosure further includes a heat exchanger with a tube sheet, a bore formed through the tube sheet and having an axis, cantilevered members in a plane that is substantially normal to the axis of the bore and each having a portion projecting radially outward from the axis and past the outer periphery of the bore, an annular plug body inserted in an end of the bore and coupled to the cantilevered members, a seal member coupled to the plug body and disposed on the end of the bore opposite the plug body, and a sealing interface between the bore and the seal member.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

FIG. 5A is a side perspective view of an example of a drilling device.

FIG. 5B is a side view of a portion of the drilling device of FIG. 5A.

FIG. 6 is a perspective view of an example of a spreader tool.

FIG. 7 is a perspective view of a drill support.

DETAILED DESCRIPTION OF THE EXEMPLARY EMBODIMENTS

Figure 1:
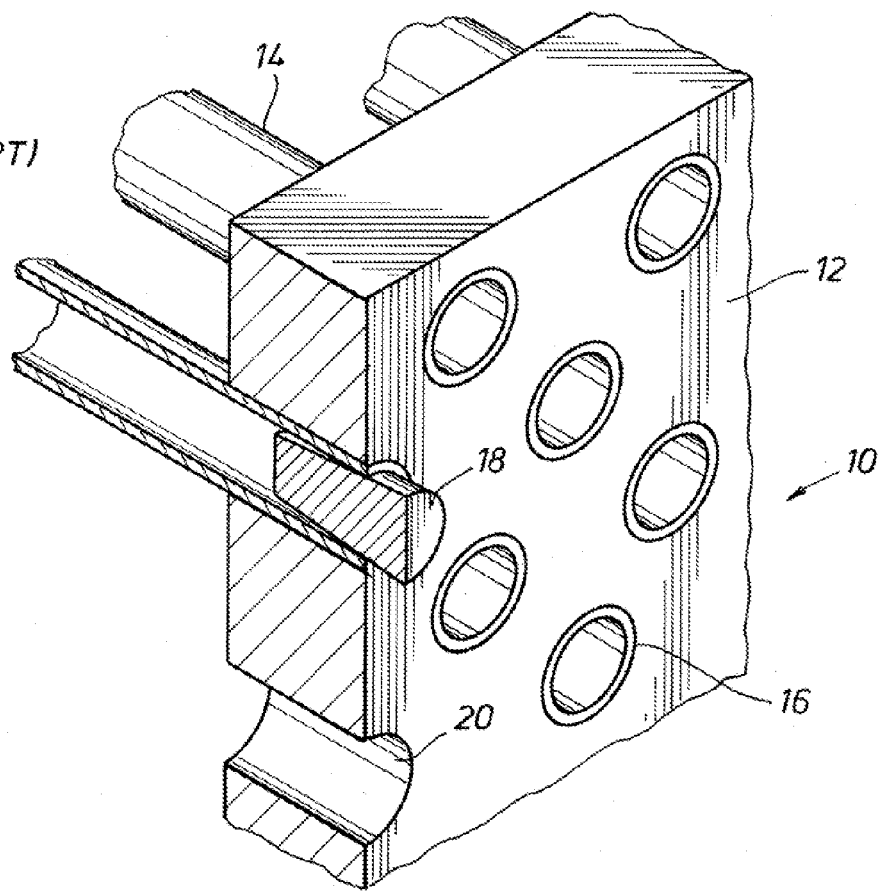
FIG. 1 is a perspective view of a prior art plug in the tube sheet of a heat exchanger.
Figure 2:
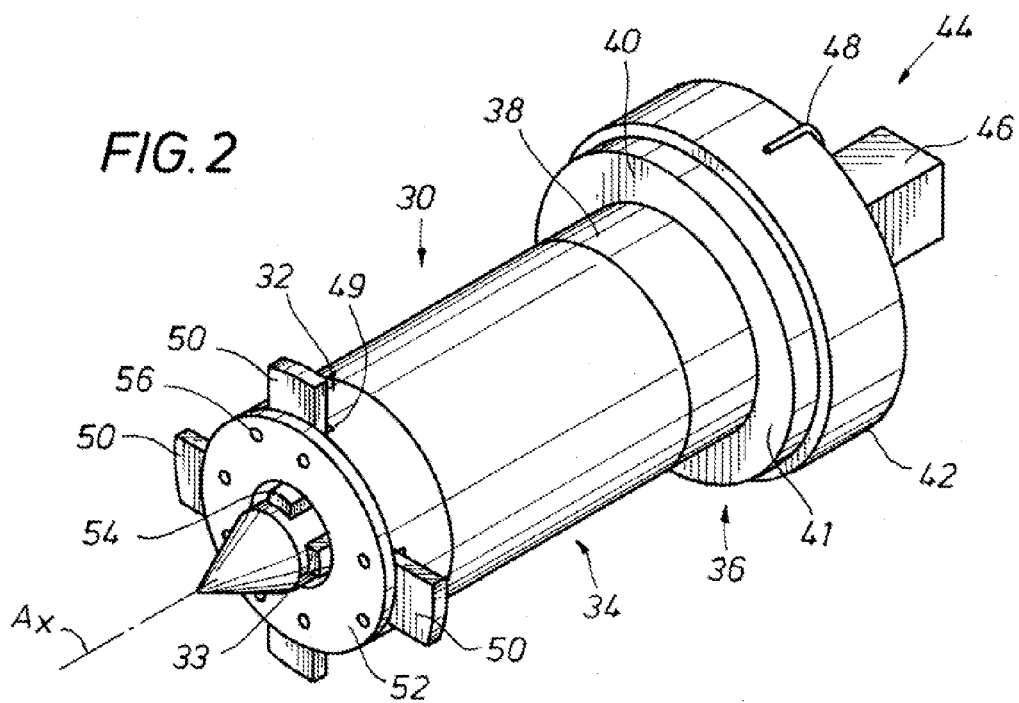
FIG. 2 is perspective view of an example of a plug kit of the present disclosure.

An example of a plug kit 30 in accordance with the present disclosure is shown in a side perspective view in FIG. 2. In this example, the plug kit 30 is an elongated member that includes on one end an annular plug body 32. The plug body 32 includes a plug annulus 33 axially formed therethrough and along an axis $A_x$ of the plug kit 30. The plug kit 30 also includes a collar 34 shown coaxial with and adjacent to the plug body 32. As will be described in further detail below, in one example the collar 34 is formed from a pliable material. Thus the outer circumference of the collar 34 increases when it is axially compressed. A packing member 36 is shown coaxially to the collar 34 on a side opposite the plug body 32. The packing member 36 includes a cylindrical packing member neck 38 adjacent the collar 34 and a cylindrical washer portion 40. The boundary between the neck 38 and washer portion 40 is defined by a transition of increased outer diameter. The transition on the packing member 36 forms an annular surface 41 shown substantially transverse to the axis $A_X$ and facing towards the front portion of the plug kit 30. A cylindrical nut 42 is shown on the rearward end of the plug body 32 and on the side of the packing member 36 opposite the collar 34.

A bolt 44 projects through the plug kit 30 from the rearward side of the nut 42 with its forward end protruding outward of the plug annulus 33 past the forward end of the plug body 32. An optional rectangularly-shaped bolt head 46 is shown provided on the rearward end of the bolt 44. An optional retention pin 48 extends through the bolt 44 transverse to the axis $A_x$. Cantilevered members 50 are shown projecting radially outward from the plug body 32 from within slots 49 provided at various locations around the outer periphery of the plug body 32. The cross section of the cantilevered members 50, as shown, is substantially rectangular. However, embodiments exist having other cross-sectional shapes, such as oval, circular, and any type of polygon. The cantilevered members 50 are selectively moveable within the slots 49 and can be fully inserted into the slots 49 so that the outer radial edges of the cantilevered members 50 do not extend past the outer periphery or circumference of the plug body 32. For the purposes of discussion herein, the arrangement of the cantilevered members 50 as shown is the deployed position. When substantially retracted within the slots 49, the arrangement is referred to as the stowed position.

Threaded passages 52 are formed on the forward surface of the plug body 32. A cantilevered tab 54 is illustrated attached on an end of each cantilevered member 50 proximate the axis $A_x$. As will be described in more detail below, the cantilevered tabs 54 are elongate members and aligned substantially parallel to the axis $A_x$. Threaded fasteners, such as screws 56, are insertable into the threaded passages 52 into corresponding openings (not shown) in the cantilevered members 50. Inserting the screws 56 into the passages 52 and cantilevered members 50 can retain the cantilevered members 50 in the as shown deployed position.

Figure 3:
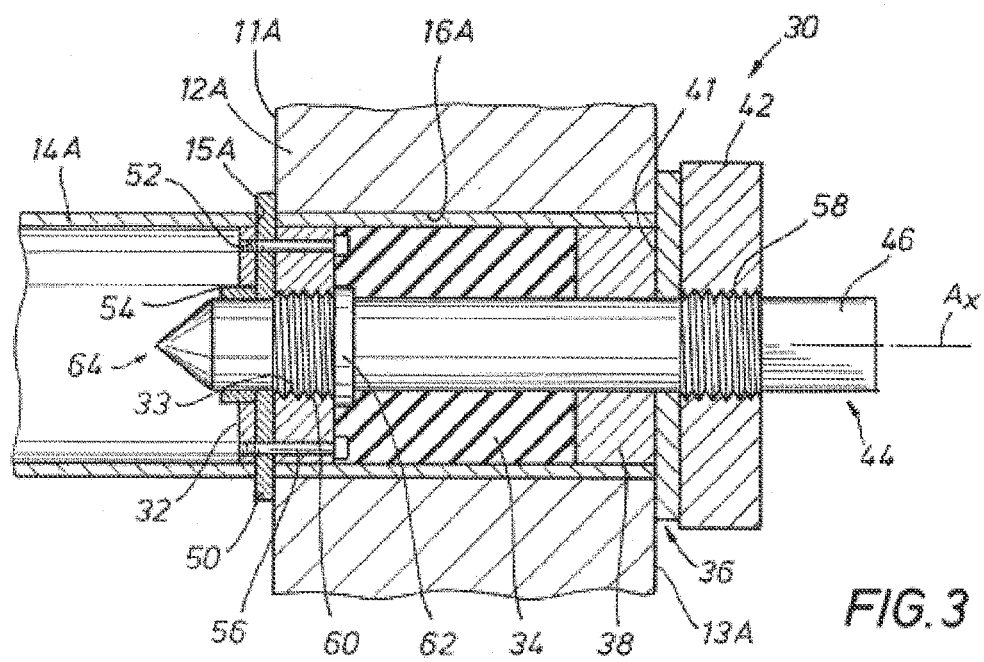
FIG. 3 is a side sectional view of the plug kit of FIG. 2 in a tube sheet.

A side sectional view of the plug kit 30 is shown in FIG. 3. In this example, the plug kit 30 is combined with a tube sheet 12A that includes a bore 16A formed through the tube sheet 12A. Slots 15A have been formed through the tube 14A allowing the cantilevered members 50 to project radially outward from a stowed position and into the deployed position as shown. Alternatively, the slots 15A may be formed through the tube 14A some lateral distance away from the tube sheet 12A so that the cantilevered members 50 are not in contact with the tube sheet 12A when projecting through the slots 15A. Further illustrated in FIG. 3 are corresponding threads 58 formed on the outer surface of the bolt 44 and inner surface of an annulus formed through the nut 48. Additional threads 60 are provided on the outer surface of the bolt 44 on its opposite end and the inner surface of the plug annulus 33. Engaging these threads 58, 60 and further rotating the bolt 44 generates in a tension force in the bolt 44 that transfers to opposing sides of the tube sheet 12A. The tensile forces transfer from the annular surface 41 on the washer 40 to an outer surface 13A of the tube sheet 12A that circumscribes the opening of the bore 16A on the outer surface 13A. An oppositely directed force is transferred to the inner surface 11A of the tube sheet 12A from rearward facing side surfaces of the cantilevered members 50. Sufficient engagement of the threads 58, 60 results in a force along the area where the annular surface 41 contacts the outer surface 13A creates a sealing interface. A flange 62 is shown on the bolt 44 positioned rearward of the threads 60. In one example, the flange 62 can provide a stop point to limit further engagement of the threads 60 by additional rotation of the bolt 44. Also illustrated, are the screws 56 within the passages 52 to retain the cantilevered members 50 in the deployed position.

Figure 4A:
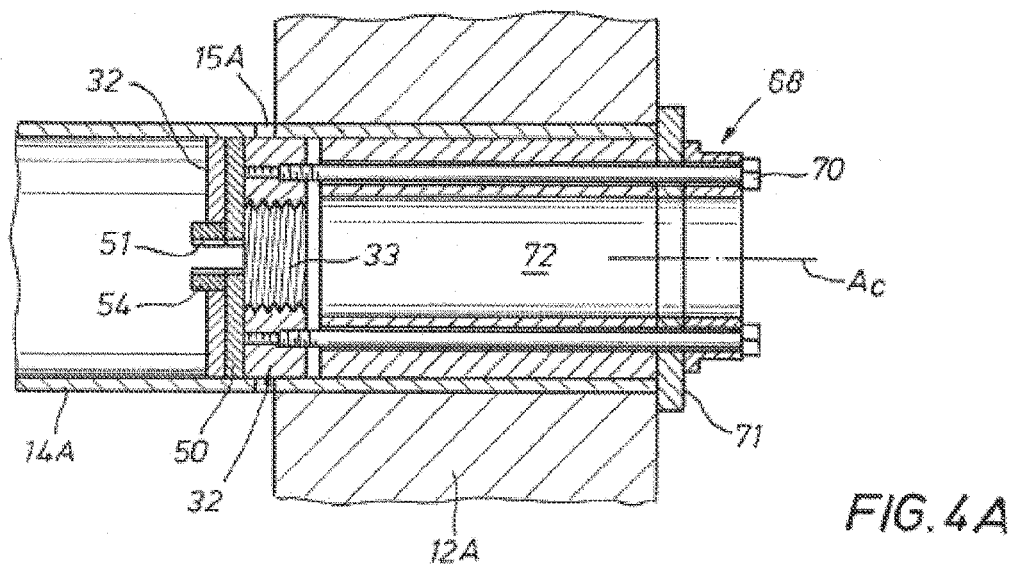
FIGS. 4A-4C are side sectional views of an example of installing a portion of the plug kit of FIG. 2.
Figure 4B:
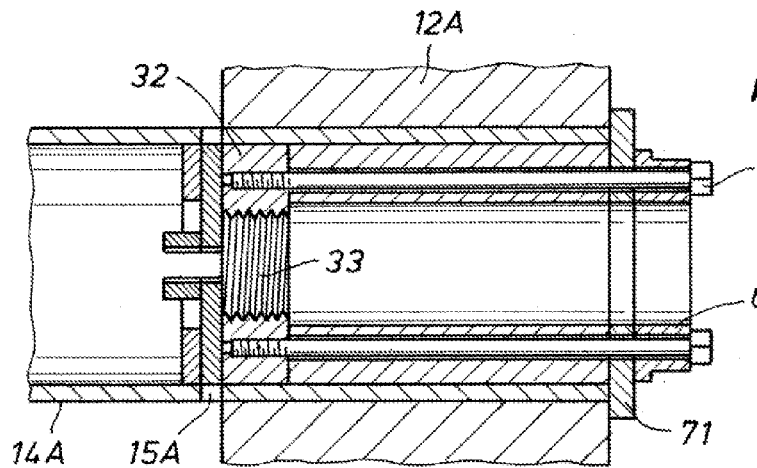
Figure 4C:
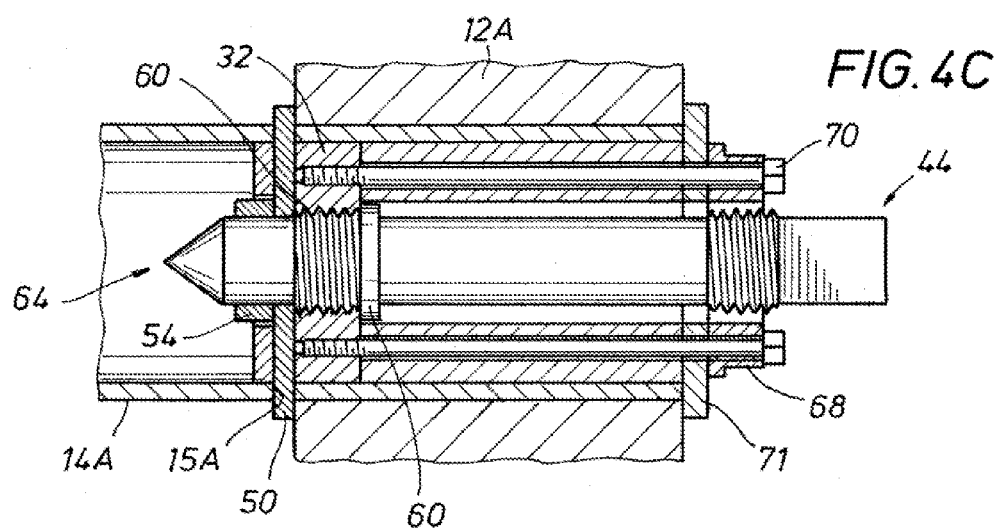

FIGS. 4A through 4E illustrate an example of inserting the plug kit 30 into engagement with the heat exchanger 10A. Referring to FIG. 4A, an annular carrier 68 is shown coupled to the plug body 32 portion of the plug kit 30. Bolts 70 are provided shown projecting through the carrier 68 and attaching to a rearward lateral side of the plug body 32. A carrier bore 72 is shown formed along the carrier axis $A_c$ having a diameter greater than the plug annulus 33. While attached to the carrier 68, the cantilevered members 50 are in the stowed position substantially inside of the outer periphery of the plug body 32. In this embodiment, the inner edges 51 of the cantilevered members 50 are within the plug annulus 33. As shown in FIG. 4B, the plug body 32 can be inserted within the bore 16A while retained by and coupled to the carrier 68. Carrier 68 insertion into the bore 16A is limited by a lip 71 shown extending radially outward from the carrier 68. With the carrier 68 still coupled with the plug body 32, the bolt 44, as illustrated in FIG. 4C, can be inserted through the carrier bore 72 and coupled with the plug body 32 by engaging the threads 60. By urging the bolt 44 through the plug annulus 33, the inner edges 51 of the cantilevered members 50 are contacted by the conical shape of the bolt end 64 and urged radially outward and into the slots 15A in the tube 14A. In an example embodiment, both ends of the tube 14A are plugged. At this point, the bolts 70 can be removed thereby allowing release of the carrier 68 and enabling the remaining portions of the plug kit 30 to be coupled with the bolt 44 and plug body 32.

Figures 4D, 4E:
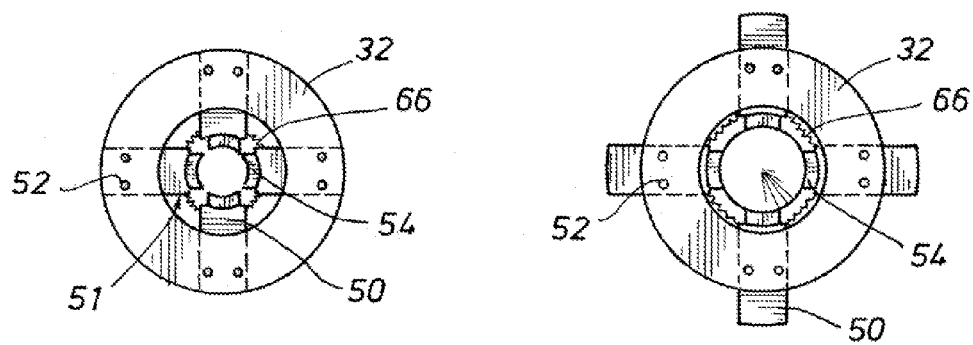
FIG. 4D is an end view of the plug kit of FIG. 4B.
FIG. 4E is an end view of the plug kit of FIG. 4C.

FIG. 4D illustrates an end view of the plug body 32 of FIGS. 4A and 4B. As shown in this embodiment, the inner edges 51 of the cantilevered members 50 are in a stowed position and within the plug annulus 33. An optional spring member 66 may be connected between each of the cantilevered members 50 and in the region of their inner edges 51. It is pointed out that when in the stowed position, the plug body 32 is insertable within the bore 16A. Accordingly, as long as the cantilevered members 50 are sufficiently retracted to allow inserting the plug body 32 into the bore 16A, the cantilevered members 50 are considered to be in the stowed position. Thus in one example, a stowed position includes a configuration where a portion of the outer edge 53 of the cantilevered members 50 extends radially past the outer diameter of the plug body 32.

FIG. 4E is an end view of the plug body 32 of FIG. 4C, without the bolt 44 inserted into the plug annulus 33. As shown, the inner edge 51 of each of the cantilevered members 50 is radially past the outer diameter of the plug annulus 33 and the outer edge 53 of the cantilevered members projects past the outer diameter of the plug body 32. The cantilevered tabs 54 are positioned along the outer diameter of the plug annulus 33, thereby providing a stopping point or retaining mechanism for retaining the cantilevered members 50, Since the cantilevered tabs 54 project along the axis $A_X$, the cantilevered members 50 may be returned to a stowed position by applying a force on the tabs 54 directed toward the axis $A_X$. Accordingly, one of the advantages of the embodiment of the plug kit 30 described herein is the tensile forces stored within the plug kit 30 prevent dislodging the plug kit due to pressure forces applied on either side of the tube sheet 12A.

An example of a tube drilling device 74 for use in forming slots 15A is illustrated in a side perspective view in FIG. 5A. In this embodiment, the tube drilling device 74 includes an outer housing 76, and a drive belt 78 mechanically coupled between a drive source and a machining element 80. Outwardly urging the machining element 80 into contact with a tube while rotating the element 80 can machine the tube. The machining element 80 is mounted within a chuck 82 shown coupled within a drive pulley 84. The drive belt 78 engages the drive pulley 84 on its outer circumference for rotating the machining element 80. The chuck 82 is attached to a bearing 86 that in turn couples on its lower end to an upper saddle 88. Inclusion of the bearing 86 allows the chuck 82 to rotate with respect to the upper saddle 88.

An end-looking view of the saddle 88 is shown in FIG. 5B. The lower end of the saddle 88 shown having a groove formed longitudinally along the lower surface of the upper saddle 88. A lower saddle 90 is shown beneath the upper saddle 88 and anchored to the housing 76. The lower saddle 90 includes a groove on its upper surface having a shape corresponding to the groove on the lower surface of the upper saddle 88. An optional spring 92 is shown attached on one end to the base just beneath the lower saddle 90 and on its other end to structure coupled with the upper saddle 88. Referring now to FIG. 5A, an elongated wedge 94 is shown disposed in the corresponding grooves formed within the upper and lower saddles 88, 90. The height or width of the wedge 94 is shown increasing with distance away from the saddles 88, 92. Thus urging the wedge 94 forward positions the thicker portion of the wedge 94 between the saddles 88, 90 thereby upwardly urging the upper saddle 88, bearing 86, chuck 82, and machining element 80.

Optionally, a return rod 96 may be included within the wedge 94 that extends past the terminal end of the wedge 94 and out the forward end of the housing 76. A spring 95 is shown coupled with the return rod 96, so that urging the wedge 94 and return rod 96 forward extends the spring 95 and stores potential energy therein. Removing the urging force from the return rod 96 releases the potential energy stored in the elongated spring 95 allowing it to contract to its original configuration and urge the wedge 94 and return rod 96 to its position shown in FIG. 5A.

A rectangular-shaped connector frame 98 is shown attached to the wedge 94 proximate its widest/thickest portion. The connector frame 98 includes a forward transverse member that couples with the wedge 94 and projects outside of the frame 96 in a direction substantially normal to the return rod 96. The frame 98 includes a parallel members oriented normal to the transverse members and directed in a direction opposite the wedge 94. A rearward transverse member connects between the parallel members and forms the rearward portion of the connector frame 98. An outer push rod 100 couples on the outer surface of the housing 76 and on a side opposite the spring 95 and extends through a bore (not shown) in the rearward portion of the connector frame 98. A rod sleeve 102 mounts on the rearward side of the connector frame 98 and circumscribes the portion of the outer rod 100 shown past the connector frame 98. Threads 104 are provided on the portion of the outer push rod 100 within the sleeve 102. A positioning nut 106 is rotatably attached on the free end of the sleeve 102; threads formed on the nut 106 engage the threads 104 on the outer push rod 100. Rotating the nut 106 urges the sleeve 102 along the length of the outer push rod 108, thereby providing transverse motivation of the connector frame 98 that in turn pushes or pulls the wedge 94.

As noted above, sliding the wedge 94 between the upper and lower saddles 88, 90 outwardly urges the machining element 80 for machining through a tube. A gear 108 is shown coupled with the drive belt 78 on its end opposite the drive pulley 84. Thus rotating the gear 108 in turn rotates the machining element 80. The gear 108 is mounted on a shaft 110 and coupled to bearings 112 for mounting onto the housing 76. A drive source (not shown) can be coupled to the shaft 110 for rotating the gear 108. Thus, in one example of use, the housing 76 is inserted within a tube and the drive source is activated to rotate the machining element 80. A slot 15A is formed in a tube 14A by radially projecting the rotating machining element 80 through the housing 76. It is believed that it is within the capabilities of those skilled in the art to provide a drive force capable of delivering sufficient power and energy for machining through a tube of a heat exchanger. Moreover, it is within the scope of those skilled in the art to position the machining element 80 for forming a slot 15A in a desired location.

In some instances, it may be necessary to provide an additional force on the inner edge 51 of the cantilevered members 50 to force them through the slots 15A formed in a tube 14A. Referring now to FIG. 6, an example of a spreader tool 114 is shown in a side perspective view. In this example, the spreader tool 114 includes an elongated shaft 116 having a rectangular cross-section. The shaft 116 has increasing outer diameters with distance away from its forward tip, so that the spreading force can be gradual when applying it within the plug body 32.

Shown in FIG. 7, is a perspective view of one example of a drill support 118 for supporting the drilling device 74. The drill support 118 includes a semicircular support sling 120 having a collar 122 provided and attached to one end of the support sling 120. The collar 122 is substantially circular having a split portion included within its circumference. A raised section is shown provided on both sides of the split portion having passages formed there through sized to receive collar screws 124. Inserting and tightening the collar screws 124 reduces the diameter of the collar 122 for securing the drilling device 74 within the collar 122. An elongate planar tool base 126 is shown in the bottom portion of the sling 120. The tool base 126 is positioned so it is in alignment with the elongate length of the support sling 120. In the embodiment of FIG. 7, a portion of the tool base 126 extends past the terminal edge of the support sling 120 in a direction opposite attachment of the collar 122. A U-shaped screw frame 128 may be attached on the rearward surface of the collar 122. Adjustment screws 130 are shown that project through the frame 128 and into engagement with the rearward edge of the tool base 126. Rotating the screws 130 positions the tool base 126 at various lengthwise positions within the support sling 120.

Figure 8:
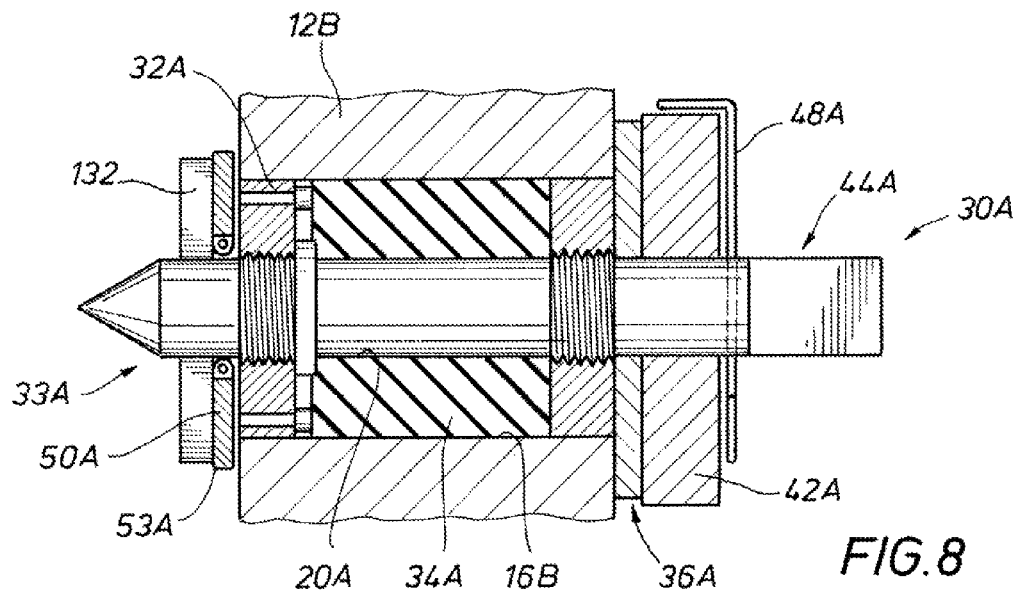
FIG. 8 is a side sectional view of an alternative embodiment of a plug kit.
Figure 9:
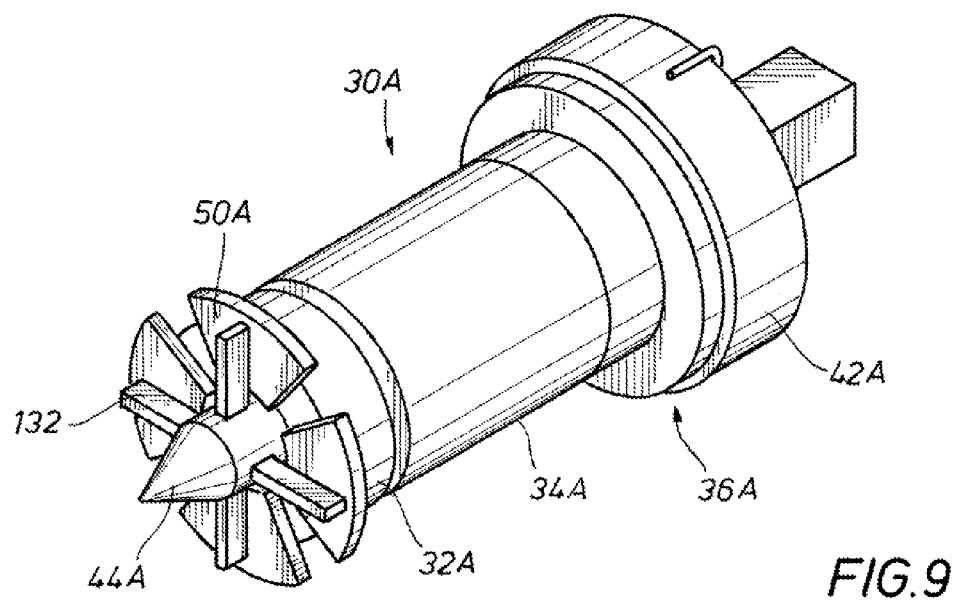
FIG. 9 is a perspective view of the plug kit of FIG. 8.

An alternate embodiment of a plug kit 30A is shown in a side sectional view in FIG. 8. In this example, the plug kit 30A is inserted into a bore 20A of a tube sheet 12B that does not include a corresponding tube. The cantilevered members 50A of this embodiment are coupled onto the plug body 32A on its forward facing surface directed away from the tube sheet 12B. The cantilevered members 50A are pivotingly attached around a pivot point that is on the edge of the members 50A proximate the annulus 33A of the plug body 32A. Bolt 44A shown projecting through the plug body annulus 33A. As shown, the cantilevered members 50A are in a deployed position wherein their outer upper edges 53A extend past the diameter of the bore 16B. Ridge members 132 are shown coupled to the cantilevered members 50A on a surface opposite the tube sheet 12B. The ridge members 132 of FIG. 8 are elongate and have an inner edge in contact with the bolt 44A. In one embodiment, projecting the bolt 44A through the annulus 33A contacts the ridge members 132 to outwardly pivot the cantilevered members 50A into a deployed position. Threadingly engaging the nut 42A and bolt 44A tensions the bolt 44A to form a sealing interface around the bore 20A. It should be pointed out that use of the embodiments of the plug kits described herein is not limited to bores and tube sheets but can include any type of bore through which a sealing function is desired. Shown in FIG. 9 is a perspective view of the plug kit 30A of FIG. 8. In this example, contact between the edges of the ridge members 132 and bolt 44A is illustrated that in turn provides a locking force to maintain the cantilevered members 50A in their deployed position for maintaining the plug kit 30A in a sealing function.

Having described the invention above, various modifications of the techniques, procedures, materials, and equipment will be apparent to those skilled in the art. While various embodiments have been shown and described, various modifications and substitutions may be made thereto. For example, alternative embodiments of the bolt 44 include any type of threaded fasteners. Accordingly, it is to be understood that the present invention has been described by way of illustration(s) and not limitation. It is intended that all such variations within the scope and spirit of the invention be included within the scope of the appended claims.

What is claimed is:

1. A plug kit for plugging a bore in a tube sheet comprising:
an annular plug body having an axis, an outer periphery, a passage axially extending therethrough, and rectangular slots extending radially through the plug body between the passage and the outer periphery and along a portion of a circumference of the plug body;
rectangular planar members that are separate from the plug body and are in a plane perpendicular with the axis of the body and selectively moveable in the slots between a retracted position encompassed by the plug body outer periphery, and a deployed position having a portion of the planar members projecting past the plug body outer periphery and through openings formed in a sidewall of a heat exchanger tube attached to the tube sheet;
an annular member coaxial with the passage; and
a threaded fastener engaged on one end with the plug body and engaged on an opposite end with the annular member having an unthreaded portion with an outer surface with a constant radius, and that unthreaded portion comes into direct contact with and biases the planar members into the deployed position when the threaded fastener is engaged with the plug body, so that when the planar members are in the deployed position and disposed on one side of a tube sheet, the annular member is disposed on a side of the tube sheet opposite the planar members, and the threaded fastener passes through the bore of a tube sheet, engaging the threaded fastener to the plug body and the annular member sealingly plugs the tube sheet bore;

wherein the threaded fastener comprises a bolt with a conically shaped end that is unthreaded and that when urged axially through the plug body urges the planar members radially outward and away from the axis so that the entire portion of the threaded fastener that biases the planar members radially outward is unthreaded, and wherein the threaded fastener has threads proximate the bolt head that are threadingly fastened to the plug body when the planar members are in the deployed position, and wherein the threaded fastener further comprises threads on an end distal from the bolt head that are threadingly fastened to the annular member when the planar members are in the deployed position; and an annular packing member that sets between the tube sheet and the annular member.

2. The plug kit of claim 1, further comprising an unthreaded annular packing member that circumscribes the threaded fastener having a portion that extends into the tube sheet bore and another larger diameter portion that sets between the tube sheet and the annular member.

3. The plug kit of claim 1, wherein the annular member is threaded to the fastener and wherein all of the annular member is outside of the bore in the tube sheet.

4. The plug kit of claim 1, further comprising ridge members coupled with the planar members on a side facing opposite the annular member when the planar members are in the deployed position, wherein the edges of each planar member closest to an axis of the threaded fastener are pivotingly attached to the side of the body opposite the annular member, and wherein the annular member has an outer diameter that is greater than a diameter of the tubesheet bore, and wherein the annular member abuts an outer end of the tubesheet bore.

5. The plug kit of claim 1, further comprising an elongated tab element attached to a planar member on an end proximate the axis and oriented substantially normal to the axis.

6. The plug kit of claim 5, wherein the threaded fastener is in contact with an end of each tab element.

7. The plug kit of claim 1, further comprising an annular plug body holder selectively attachable with the plug body and insertable with the plug body into a tube sheet bore, an axial bore in the plug body holder with a diameter greater than the threaded fastener outer diameter, so that the threaded fastener bolt is insertable through the axial bore and attachable to the plug body.

8. The plug kit of claim 1, further comprising a fastener connected between the plug body and the planar members when the planar members are in the deployed position.

9. A heat exchanger comprising:
a tube sheet,
a bore formed through the tube sheet and having an axis;
a heat exchanger tube inserted into the bore;
slots preformed completely through a sidewall of the heat exchanger tube; a plugging member comprising:
planar members having elongate lengths that are normal to the axis of the bore and each having a portion projecting radially outward from the axis past the outer periphery of the bore, and through the slots formed in the sidewall of the heat exchanger tube;
an annular plug body inserted in an end of the bore and coupled to the planar members;
a planar seal member directly coupled to the plug body and disposed over an opening of the bore opposite the plug body and a sealing interface between the bore and the seal member;
an annular member directly threaded to a bolt outside of the bore;
the bolt directly threaded to the plug body and the seal member, and having an unthreaded conically shaped end that directly leads to a constant radius section that is also unthreaded that when urged axially through the plug body, from the direction the plugging member enters the bore, urges the planar members radially outward through the slots; and
a sealing interface between the bore and the seal member.

10. The heat exchanger of claim 9, wherein the planar members have an outer radial ends that are distal from the axis and inner radial ends proximate the axis that are separate from the plug body.

11. The heat exchanger of claim 9, further comprising tab members coupled with the planar members on a side opposite the seal member, wherein the edge of each planar member closest to the bore axis is pivotingly attached to the side of the body opposite the seal member.

* * * * *